3,447,971
NEUTRAL SECONDARY BATTERY
Frank E. Ammerman, Ann Arbor, Mich., assignor to Chrysler Corporation, Highland Park, Mich., a corporation of Delaware
No Drawing. Filed Dec. 30, 1966, Ser. No. 605,969
Int. Cl. H01m 41/00
U.S. Cl. 136—26          7 Claims

ABSTRACT OF THE DISCLOSURE

A neutral, secondary or chargeable zinc-lead oxide battery having an electrolyte which contains no free acid. The electrotrolyte in its simplest form is an aqueous solution of zinc sulfate. Beginning with such an aqueous solution the battery is charged which converts the positive plate to lead dioxide, deposits zinc at the negative plate and transforms the aqueous solution to a condition of substantial solvation energy.

BACKGROUND OF THE INVENTION

The present invention relates to a zinc-lead oxide battery which is readily chargeable and, therefore, presents a complete departure from heretofore described zinc-lead oxide batteries. Thus, while zinc-lead oxide batteries are known, they have always been considered as a primary battery which cannot be recharged electrically due to the use therewith of an electrolyte having a high acid content.

Although the concept of a zinc-lead oxide battery system offers many advantages, it has never been developed for commercial application due to the difficulties associated therewith. These difficulties are attributable to the belief that it is necessary to employ an electrolyte containing a large amount of an acid such as sulfuric acid. In actuality, however, such an electrolyte is incompatible with a battery system employing zinc therein since zinc is readily soluble in acids. Therefore, the heretofore known zinc-lead oxide battery devices had extremely limited shelf life since the negative zinc electrode would simply dissolve in the electrolyte. Moreover, due to the presence of free acid, that is, solutions containing acids dissolved in a solvent, it was impossible to adequately charge the battery due to excessive voltage requirements.

Prior to this invention, efforts to overcome the above problems have generally been unsuccessful with the result that a chargeable or secondary zinc-lead oxide battery has not found commercial acceptance. Having been unsuccessful in finding a solution to the problem of redepositing zinc on a negative plate which is immersed in a free acid containing electrolyte, those in the art have concerned themselves with methods of inhibiting the spontaneous corrosion or dissolving of the zinc electrode. For example, Voss in U.S. Patent No. 2,982,806 discloses that the corrosion resistance of a zinc electrode can be improved through the use of organic additive agents and thallium salts which form an amalgam with mercury. However, Voss like his predecessors in the field, does not offer a solution to the basic problems which have prevented commercial use of the zinc-lead oxide concept. Thus, Voss still teaches to employ a sulfuric acid electrolyte which, even in the discharged state, dissolves the zinc negative plate and prevents adequate charging of the battery.

SUMMARY

An object of the present invention, therefore, is to provide a zinc-lead oxide battery system which can be easily and readily charged.

A further object is to provide a zinc-lead oxide battery system in which the negative zinc plate has excellent shelf life.

Yet another object is to provide a zinc-lead oxide battery which can be charged at a high rate without harm.

Other objects and advantages of the present invention will become apparent from a further reading of the description and the appended claims.

This invention is based on my discovery that a highly efficient secondary zinc-lead oxide battery can be produced which does not require the presence of a free acid in the electrolyte. Since free acid is not present in the electrolyte, the above described problems of charging and dissolving of the negative zinc plate are not presented.

The battery of the present invention is formed by immersing a lead-oxide plate and a second plate in an aqueous solution of zinc sulfate. A current is then passed between these plates and zinc is deposited on the second plate. Surprisingly, the zinc sulfate solution is simultaneously placed in a condition such that upon discharge the previously deposited zinc readily goes into solution as zinc ions. The battery system has been found to function as a lead acid battery at the positive plate; i.e., the reversible reaction is $PbO_2 \rightleftarrows PbSO_4$. The zinc reaction is $Zn \rightleftarrows Zn^{++}$.

DESCRIPTION

The zinc-lead oxide battery of this invention can be constructed in the same manner as presently known zinc-lead oxide batteries employing acid electrolytes. For example, FIGURE 2 of U.S. Patent 2,982,806 illustrates a suitable construction of such a battery. As this construction is well known to those skilled in the art, details thereof will not be repeated herein.

The electrolyte used in the battery of this invention comprises an aqueous solution of zinc sulfate. No free acid, such as sulfuric acid, is added to this solution and, therefore, the make up of the electrolyte represents a complete departure from the electrolytes previously employed in zinc-lead oxide batteries. The electrolyte is prepared by dissolving zinc sulfate in water. It has been found that the concentration of zinc sulfate in the electrolyte should preferably be at least about 70 grams per liter of water in order to provide a battery having a good current output capability. The components of the electrolyte do not have to be of any special degree of purity and good results have been achieved using tap water and technical grade chemicals.

In order to provide an electrolyte with a low freezing point, it is generally preferred to employ a concentration of zinc sulfate of between about 350 and 450 grams per liter of zinc sulfate per liter of water. If an electrolyte having a still lower freezing point is desired, an additional salt can be dissolved into the aqueous zinc sulfate solution. Any salt which is compatible with the zinc and lead oxide plates and aqueous zinc sulfate solution, that is, which does not react with the other components so as to interfere with their function, can be used for this purpose. A preferred compound for this use is sodium sulfate. Good results have been achieved with an aqueous solution containing about 350–450 grams per liter of zinc sulfate and about 100 grams per liter of sodium sulfate.

There is no upper limit as to the amount of zinc sulfate and sodium sulfate which can be used to form the electrolyte used in the invention. However, amounts in excess of saturation are obviously not desirable since the precipitated salts merely clog the system.

The positive plate of the battery of this invention is composed of lead oxide, and any of the lead oxide materials such as are used in conventional lead-acid storage batteries can be employed. It will be understood that the term lead oxide is intended to encompass both lead monoxide and lead oxide. Thus, the positive plate can be initially composed of lead dioxide or it can be fabricated from lead monoxide or red lead which is then converted to lead dioxide upon charging of the battery. Generally, the positive plate is fabricated from a mixture of lead monoxide and lead dioxide.

The negative plate of the battery of this invention can be fabricated from any electrically conductive material since zinc is deposited upon the plate during the process of preparing the battery. Accordingly, it is not necessary to start with a pure zinc or a material of high zinc content. In practice, the negative plate has been found to be usefully formed on lead, zinc or aluminum. The size of the positive and negative plates are not critical and good results have been achieved employing a negative zinc plate having a surface area approximating one-fourth that of the positive lead oxide plate.

At this point it should be understood that the battery of this invention cannot be obtained by merely suspending a lead oxide plate and zinc plate in an aqueous solution of zinc sulfate. Since a battery is not obtainable in this manner, it is felt that this is the reason why the prior art has turned to the use of electrolytes having a high acid content. In investigating this matter, I surprisingly found that a useful battery could be obtained by contacting a lead oxide plate and a second electrically conductive plate with an aqueous solution of zinc sulfate and charging the system. The battery is preferably charged until a voltage as between the positive and negative plates of about 2.5 volts is achieved. The charging converts the positive plate to lead dioxide and deposits zinc at the negative plate according to well established electro-chemical principles. What is unpredictable is that the aqueous solution of zinc sulfate is simultaneously converted to an excellent electrolyte into which the deposited zinc will readily enter as zinc ions.

In charging the battery system of this invention, it has been found that the charging should be continued until the voltage as between the positive and negative plates reaches a value of at least about 1.5 volts. At this voltage, the internal resistance of the battery is overcome allowing a useful amount of current to be drawn therefrom. Preferably, the battery is charged until the voltage reaches a value in the range of about 2.2 to 2.5 volts. It will be recognized that the ability to develop voltages in this latter range represents a considerable advantage over the lower voltage limitations found in more conventional systems such as the lead-acid storage battery.

The aqueous solution of zinc sulfate as initially prepared has a pH in the range of 6.0 to 8.0, more generally between about 6.0 and 7.0, and therefore, in the absence of free sulfuric acid the limiting electrode has proved to be the positive lead dioxide plate. Naturally, this is a highly desirable situation as the battery can be charged at a high rate without harm. Accordingly, the battery of this invention finds excellent application as a source of power where the charging time is short and a fast charge is required. Likewise, it is capable of a heavy current drain for a short period or a slow drain for a longer period without significant performance difference. The conditions of temperature and pressure under which the battery can be charged are not critical. Likewise, freezing of the electrolyte does not damage the system and output is high until the electrolyte becomes a solid. For example, an output current of 0.5 ampere per square inch is easily obtainable under poor conditions.

The following examples illustrate the composition and performance capabilities of the neutral secondary zinc-lead oxide batteries of this invention, the invention however not being limited to the specific details of the examples.

EXAMPLE I

A battery was prepared by suspending a pressed plate of formed red lead and a plate of sheet zinc in an aqueous solution of zinc sulfate containing approximately 250 grams per liter of zinc sulfate. Each of the electrodes had a surface area of about 27 square inches. The system was then charged while at room temperature (approximately 20° C.) using an external voltage of approximately 3.2 volts until the battery reached an open cell voltage of about 2.5 volts. Various loads were then placed on the battery and the following data obtained:

Current draw

| Amperes: | Volts |
|---|---|
| 1 | 2.29 |
| 5 | 1.58 |
| 9 | 0.76 |

EXAMPLE II

A battery was prepared by suspending a pressed plate of formed red lead and a plate of lead sheet in an aqueous solution of zinc sulfate containing approximately 400 grams per liter of zinc sulfate. Each of the plates had a surface area of approximately 22 square inches. The system was then charged while at room temperature using an external voltage of about 3.5 volts until the battery reached an open cell voltage of 2.4 volts. Various loads were then placed on the battery and the following data obtained:

Current draw

| Amperes: | Volts |
|---|---|
| 1 | 2.11 |
| 3 | 1.73 |
| 12 | 0.63 |

EXAMPLE III

A battery was prepared by suspending a pressed plate composed of litharge and a plate of sheet aluminum in an aqueous solution containing 300 grams per liter of zinc sulfate and 150 grams per liter of sodium sulfate. Each of the plates had a surface area of about 22 square inches. The system was charged while at room temperature using an external voltage of about 4 volts until the battery developed an open cell voltage of 2.4 volts. Various loads were then placed on the battery and the following data obtained.

Current draw

| Amperes: | Volts |
|---|---|
| 1 | 2.26 |
| 9 | 1.77 |
| 12 | 1.64 |

EXAMPLE IV

A number of tests were conducted on batteries prepared in accordance with the teachings of this invention to determine the charging rates which could be employed over repeated discharge and charge cycles. It was found that the average maximum current that could be used without plate damage was at least 0.5 ampere per square inch. The preferred current rate for normal charging was about 0.25 ampere per square inch.

To illustrate the many desirable characteristics of the batteries produced in accordance with this invention, batteries were tested under the following conditions and showed no permanent damage:

(a) ten second direct short.
(b) discharged to one-half nominal voltage (about 1.2 v.).
(c) discharged to complete solution of zinc (from aluminum base electrode).
(d) freezing and thawing.
(e) replenishment of water loss with tap water.

It will be apparent from the foregoing description that the objects of this invention have been obtained. A new zinc-lead oxide battery has been provided based on the discovery that it is not necessary to employ a free acid containing electrolyte therein.

I claim:

1. A neutral secondary battery having a lead oxide positive plate, a zinc negative plate and an electrolyte consisting essentially of an aqueous solution of zinc sulfate which contains no free acid, said battery being produced by immersing a first lead oxide plate and a second plate into an aqueous solution of zinc sulfate, passing current through said aqueous solution to form a deposit of zinc on said second plate, and discontinuing said current passage when the voltage as measured between said first and second plates is of a value of at least about 1.5 volts.

2. A battery according to claim 1 wherein said aqueous solution contains at least about 70 grams per liter of zinc sulfate.

3. A battery according to claim 1 wherein said aqueous solution has a pH in the range of about 6 to 8 prior to passing current therethrough.

4. A battery according to claim 1 wherein said aqueous solution of zinc sulfate contains sodium sulfate dissolved therein.

5. A battery according to claim 1 wherein said second plate comprises a material selected from the group consisting of zinc, aluminum and lead.

6. A battery according to claim 1 wherein said aqueous solution contains between about 350 and 450 grams per liter of zinc sulfate.

7. A battery according to claim 1 wherein said current passage is discontinued when the voltage as measured between said first and second plates is of a value in the range of about 2.2 to 2.5 volts.

References Cited

UNITED STATES PATENTS

| | | | |
|---|---|---|---|
| 1,632,307 | 6/1927 | Miolati | 136—31 |
| 1,900,616 | 3/1933 | Pouchain | 136—31 |

FOREIGN PATENTS 14,501   7/1900   Great Britain.

ALLEN B. CURTIS, *Primary Examiner.*

A. SKAPARS, *Assistant Examiner.*

U.S. Cl. X.R.

136—30, 31; 204—55